United States Patent [19]
Bennett

[11] Patent Number: 5,423,191
[45] Date of Patent: Jun. 13, 1995

[54] CIRCULATING COLD WATER COOLER-CHILLER

[76] Inventor: James B. Bennett, 5510 77th St., Lubbock, Tex. 79424-2402

[21] Appl. No.: 59,627

[22] Filed: May 11, 1993

[51] Int. Cl.6 ............................................. F25D 17/02
[52] U.S. Cl. ........................................ 62/201; 62/64; 62/376
[58] Field of Search ............................ 62/64, 201, 376

[56] References Cited

U.S. PATENT DOCUMENTS

| | | | |
|---|---|---|---|
| 1,699,576 | 1/1929 | Wolverton | 62/201 |
| 1,912,896 | 6/1933 | Hiller | 62/64 |
| 2,140,744 | 12/1938 | Hirsch | 62/64 |
| 2,155,399 | 4/1939 | Bruce | 62/64 |
| 2,436,426 | 2/1948 | Fish | 62/435 |
| 2,618,134 | 11/1952 | Kaufman | 62/64 |
| 2,982,109 | 5/1961 | Puretic | 62/201 |
| 3,468,136 | 9/1969 | Swenson et al. | 62/64 |

Primary Examiner—William E. Wayner
Attorney, Agent, or Firm—Palmatier, Sjoquist & Helget

[57] ABSTRACT

A circulating cold water cooler-chiller comprised of a water holding tank, refrigerant cooling/thermal electric unit and a circulating pump system. The water in the water tank is cooled by coolant coils in bottom of tank and the water is circulated by an electric pump. The temperature is controlled by a thermostatic control that has a sensor in the water so as to control the refrigerant compressor/thermal electric unit operation letting the water circulation be separate and continuous at all times. Constant temperature is maintained by this type of configuration.

4 Claims, 2 Drawing Sheets

5,423,191

CIRCULATING COLD WATER COOLER-CHILLER

BACKGROUND OF THE INVENTION

The invention relates to cooling or chilling whole blood placed in the water holding tank. The cooling effect is much quicker than cold air coolers or ice coolers and maintains a consistency in temperature that other coolers can not. Some medical or chemical items are temperature sensitive and this invention will assist in handling of such materials. Such cooling devices in the past have been complex, but this present invention is a simple structure for holding water, cooling water, circulating water and controlling/recording the temperature of the water in order to closely control the temperature of items placed in said water.

SUMMARY OF THE INVENTION

The principal object of this invention is to provide a readily practical and usable cooling-chilling device for food, beverages, medical and chemical handling.

The many objects and advantages of the present invention will become apparent to those skilled in the art when the following description of the best mode contemplated for practicing the invention is read in conjunction with the accompanying drawings wherein like numerals refer to like parts and in which:

DETAILED DESCRIPTION OF THE EMBODIMENT

Figure 1:
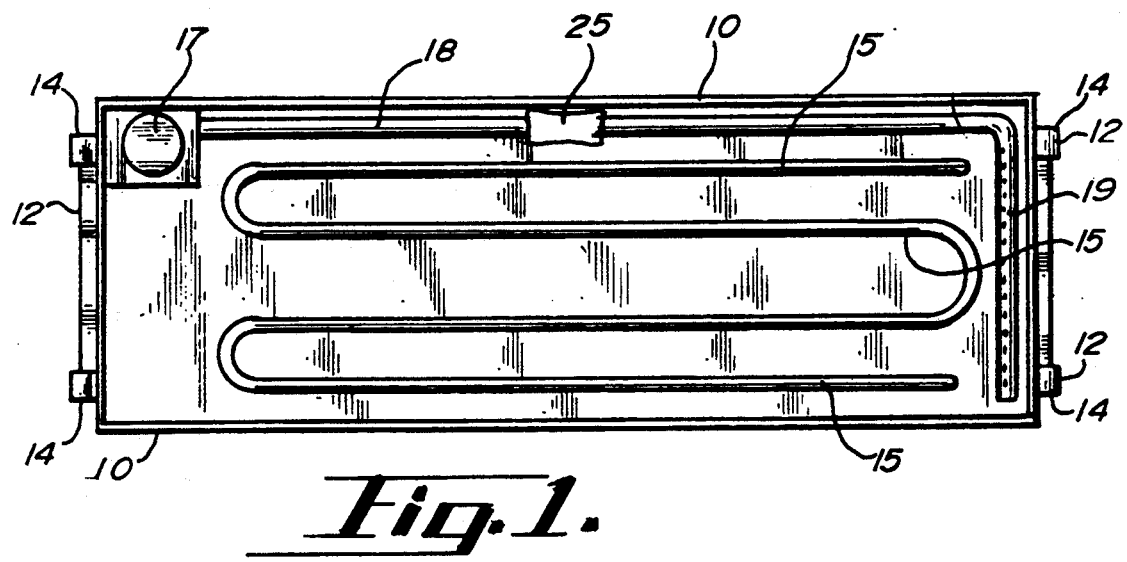
FIG. 1 is a top view of the circulating cold water cooler-chiller.
Figure 2:
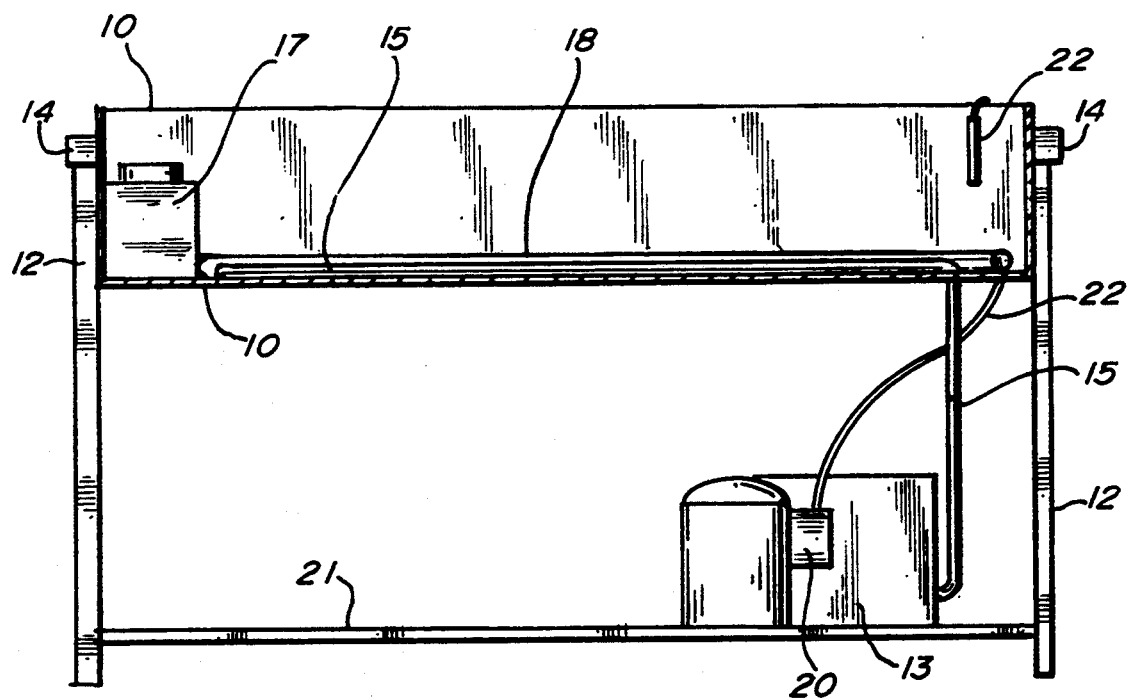
FIG. 2 is a side view of the circulating cold water cooler-chiller of FIG. 1.

Referring to the drawings and more particularly, to FIG. 2, there is illustrated a top view of a circulation cold water cooler-chiller receiving chamber or holding tank (10) provided with two pairs of legs (12). Both pairs of legs support the holding tank and are joined together by a common shelf (21) which also supports and holds the refrigerant compressor FIG. 2, FIG. 3, FIG. 4. The legs are U-shaped and slip into U-shaped receptacles (14) on both ends of holding tank (10). There are four coils of refrigerant tubing (15) in the bottom of the holding tank over which the cold water flows and is cooled. The flow of the water is accomplished by the use of an electrically operated water pump (17) located in the corner of the holding tank. The water is picked up from the bottom of the holding tank at the coldest point of cooling tube that first enters the holding tank. The water is then transferred to the opposite end of the holding tank by a transfer hose (18). The transferred water is then dispensed by a tube (19) with circulation holes pointed toward pump end of holding tank from the bottom of the holding tank (10).

As illustrated in detail at FIG. 2, the circulating cold water cooler-chiller holding tank may be made of any metal material, preferably galvanized steel or stainless steel in the form of a substantially rectangular holding tank (10). This holding tank (10) has U-shaped receptacles (14) at the end of the holding tank (10) tied together at their bottom by a common shelf (21), which also supports and holds the refrigerant compressor/thermal electric unit (13) on which the compressor temperature thermostat (20) control is mounted which has a catheter (22) for sensing water temperature in holding tank (10). The compressor temperature thermostat (20) controls the refrigerant compressor/thermal electric unit (13) to maintain the temperature of the water to be 2 degrees Centigrade to 6 degrees Centigrade.

The apparatus also includes a filtering means (25) in the path of the cooled liquid to kill and remove bacteria, organic, and organic chemical material from the coolant liquid, making the liquid sterile.

The filtering means (25) further comprises an ultraviolet light unit and membrane filter for killing and removing bacteria, and activated carbon filter for removing organic chemical material. Such filters are available from the Ultra Dynamics Corporation, 1631 10th Street, Santa Monica, Calif. 90404, and from water systems dealers such as Continental Water Systems of San Antonio, Tex. and PJD International of Santa Barbara, Calif.

Figure 4:
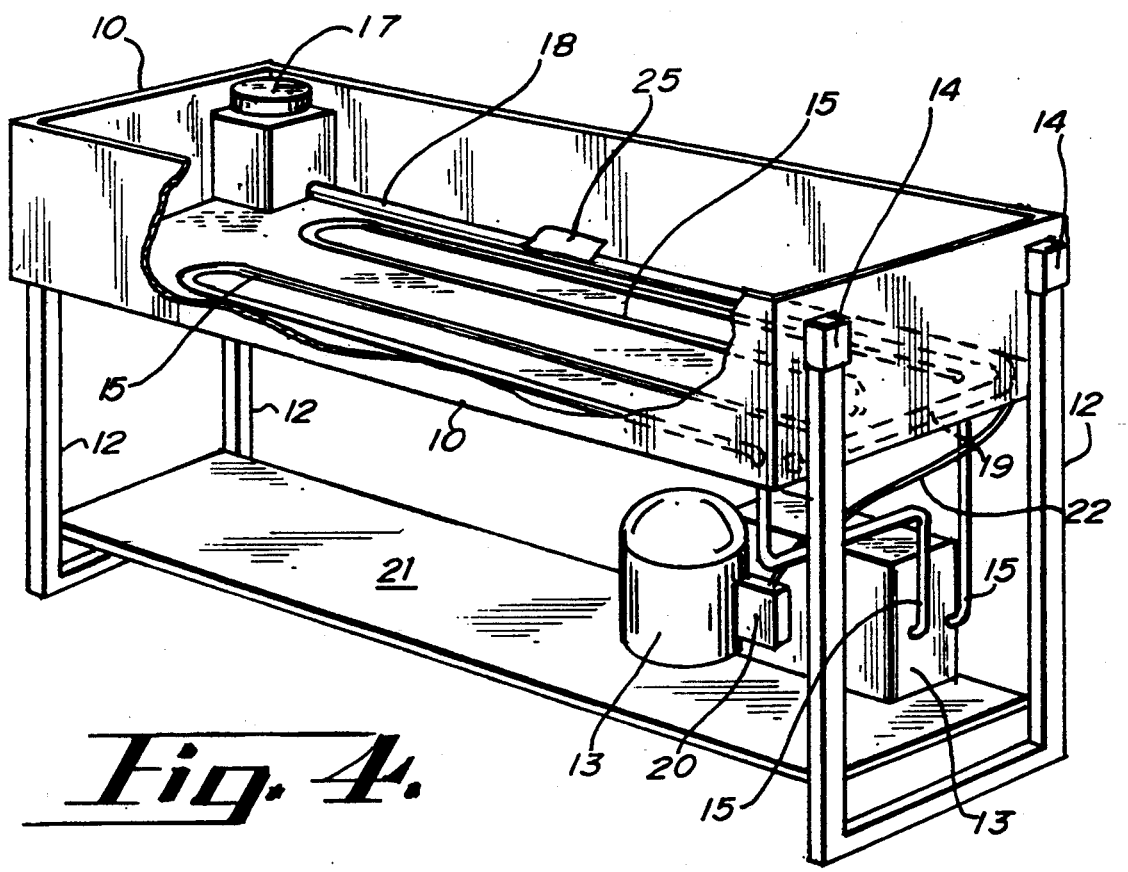
FIG. 4 is a perspective schematic view of the circulating cold water cooler-chiller.
Figure 3:
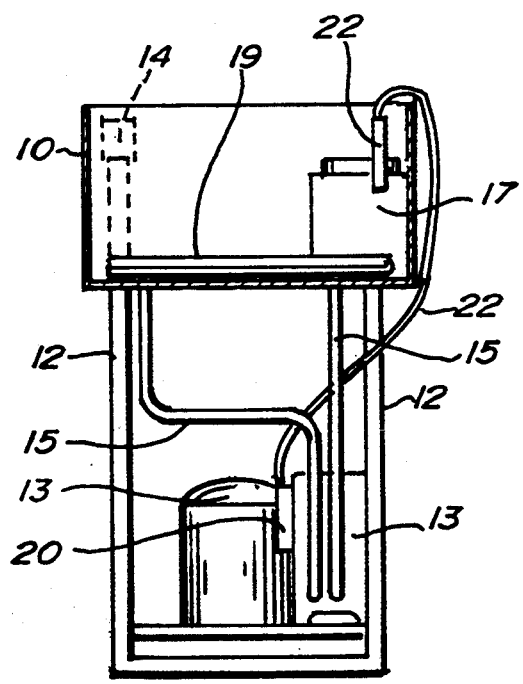
FIG. 3 is an end view of the circulating cold water cooler-chiller of FIG. 1 and FIG. 2.

What is shown by FIG. 3 is the end view of all components from that angle showing their prospective locations when the circulating cold water cooler-chiller tank (10) is viewed from the compressor/thermal electric unit (13) end. Where as the FIG. 4 is a perspective schematic view of the circulating cold water cooler-chiller viewed from the compressor (13) end. The water pump (17) and the compressor/thermal electric unit (13) are connected to a source of electrical power, not shown, through an appropriate line, not shown.

The electric water pump (17) and the refrigerant compressor (13) may be any convenient low power electric pump (17) and refrigerant compressor readily available in the market. The temperature control thermostat (20) with temperature sensing catheter (22) is also readily available in the market. The shelf (21) which joins the legs (12) and supports the compressor/thermal electric unit (13) can be provided with the appropriate caster, one at each corner, so the circulation cold water cooler-chiller may be made easily transportable.

Having thus described the present invention by way of a typical example of structural embodiment thereof, modifications whereof will be apparent to those skilled in the art. While the form of embodiment of the present invention as herein disclosed constitutes a preferred form, it is to be understood that other forms might be adopted, all coming within the scope of the claim which follows.

What is claimed is as follows:

1. An apparatus for cooling, storing and temperature controlling temperature sensitive medical, chemical, food, or beverage items such as freshly drawn whole blood at blood banks and labs, said apparatus comprising:
   a receiving chamber,
   a plurality of horizontally positioned refrigerant cooling lines in the bottom of said chamber,
   a body of liquid in said chamber having an equal volume or less than the volume of said chamber, said liquid being cooled by said refrigerant cooling lines,
   a refrigerant compressor/thermal electric unit, connected to said refrigerant cooling lines,
   an electric liquid pump located in a corner of said chamber for constantly circulating said body of liquid throughout said chamber over said refrigerant cooling lines, a tubing dispensing system connected to said pump that directs said cooled liquid onto and in between blood containers and/or other objects disposed within said receiving chamber, further comprising a transfer hose that transfers said cooled liquid from the vicinity of said pump to the opposite end of said chamber and a dispensing tube at the bottom of said chamber with circulation holes pointed toward the pump end of said chamber, a device for sensing water temperature in said chamber, a compressor temperature thermostat control which controls said refrigerant compressor/thermal electric unit to constantly maintain the temperature of said liquid to be 2 degrees Centigrade to 6 degrees Centigrade, and a filtering means in the path of the cooled liquid to kill and remove bacteria, organic, and organic chemical material from said cooled liquid.

2. The apparatus of claim 1, wherein said liquid is a sterile liquid.

3. The apparatus of claim 1, wherein said chamber is constructed of stainless steel.

4. The apparatus of claim 1, further comprising two pairs of U-shaped legs which slip into U-shaped receptacles on both ends of said chamber to support said chamber, and a common shelf connected to said U-shaped legs to support and hold a refrigerant compressor for said refrigeration system.

* * * * *